US010079614B2

United States Patent
Kushioka et al.

(10) Patent No.: US 10,079,614 B2
(45) Date of Patent: Sep. 18, 2018

(54) NOISE CANCELER

(71) Applicant: HITACHI KOKUSAI ELECTRIC INC., Tokyo (JP)

(72) Inventors: Yoichi Kushioka, Tokyo (JP); Mitsuhiro Takashima, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/575,838

(22) PCT Filed: Apr. 25, 2016

(86) PCT No.: PCT/JP2016/062909
§ 371 (c)(1),
(2) Date: Nov. 21, 2017

(87) PCT Pub. No.: WO2016/194519
PCT Pub. Date: Dec. 8, 2016

(65) Prior Publication Data
US 2018/0145709 A1 May 24, 2018

(30) Foreign Application Priority Data

May 29, 2015 (JP) ................................ 2015-109997

(51) Int. Cl.
*H04B 1/10* (2006.01)
*H04L 25/03* (2006.01)
(52) U.S. Cl.
CPC ............. *H04B 1/1027* (2013.01); *H04B 1/10* (2013.01); *H04L 25/0328* (2013.01)
(58) Field of Classification Search
CPC ........ H04B 1/1027; H04B 15/00; H04B 1/10; H04B 7/0817; H04L 25/0328; H04L 27/2691; H04L 25/03254
See application file for complete search history.

(56) References Cited

U.S. PATENT DOCUMENTS 6,192,067 B1 * 2/2001 Toda .................. H04B 1/71075
375/140
6,304,624 B1 * 10/2001 Seki .................... H04L 25/0214
375/130

(Continued)

FOREIGN PATENT DOCUMENTS

| JP | 2000-323915 A | 11/2000 |
| JP | 2014-200019 A | 10/2014 |
| JP | 2015-019166 A | 1/2015 |

OTHER PUBLICATIONS

Written Opinion of the International Searching Authority in corresponding International Application No. PCT/JP2016/062909, dated Jun. 7, 2016.

(Continued)

*Primary Examiner* — Khanh C Tran
(74) *Attorney, Agent, or Firm* — Bacon & Thomas, PLLC

(57) ABSTRACT

In a noise canceler, interference signals received by subantennas 12 are cross-correlated by a first correlation-value calculation unit and the peaks of the interference signals are detected by a first peak detector. Interference signal information is acquired by a first-interference-signal information acquisition unit and the interference signals are synthesized by an interference signal synthesizer. A signal received by a main antenna and the synthesized interference signal are correlated by a second correlation-value calculation unit and the peak of the synthesized interference signal is detected by a second peak detector. The interference signal information is acquired by a second interference-signal-information acquisition unit and an interference signal replica is generated by an interference signal replica generator. The interference signal replica is subtracted by an interference signal removal unit from the signal received by the main antenna.

12 Claims, 13 Drawing Sheets

(56) References Cited

U.S. PATENT DOCUMENTS

| | | | | |
|---|---|---|---|---|
| 6,327,298 B1* | 12/2001 | Grobert | ................... | G01S 19/21 342/357.59 |
| 6,459,694 B1* | 10/2002 | Sari | ..................... | H04B 1/7107 370/335 |
| 8,055,235 B1* | 11/2011 | Gupta | ..................... | H04B 1/10 455/296 |
| 2006/0227854 A1* | 10/2006 | McCloud | ............. | H04B 1/1027 375/148 |

OTHER PUBLICATIONS

International Preliminary Report of Patentability in corresponding International Application No. PCT/JP2016/062909, dated Dec. 5, 2017.

* cited by examiner

DESIRED SIGNAL AND INTERFERENCE SIGNALS

SIGNALS RECEIVED BY RESPECTIVE ANTENNAS

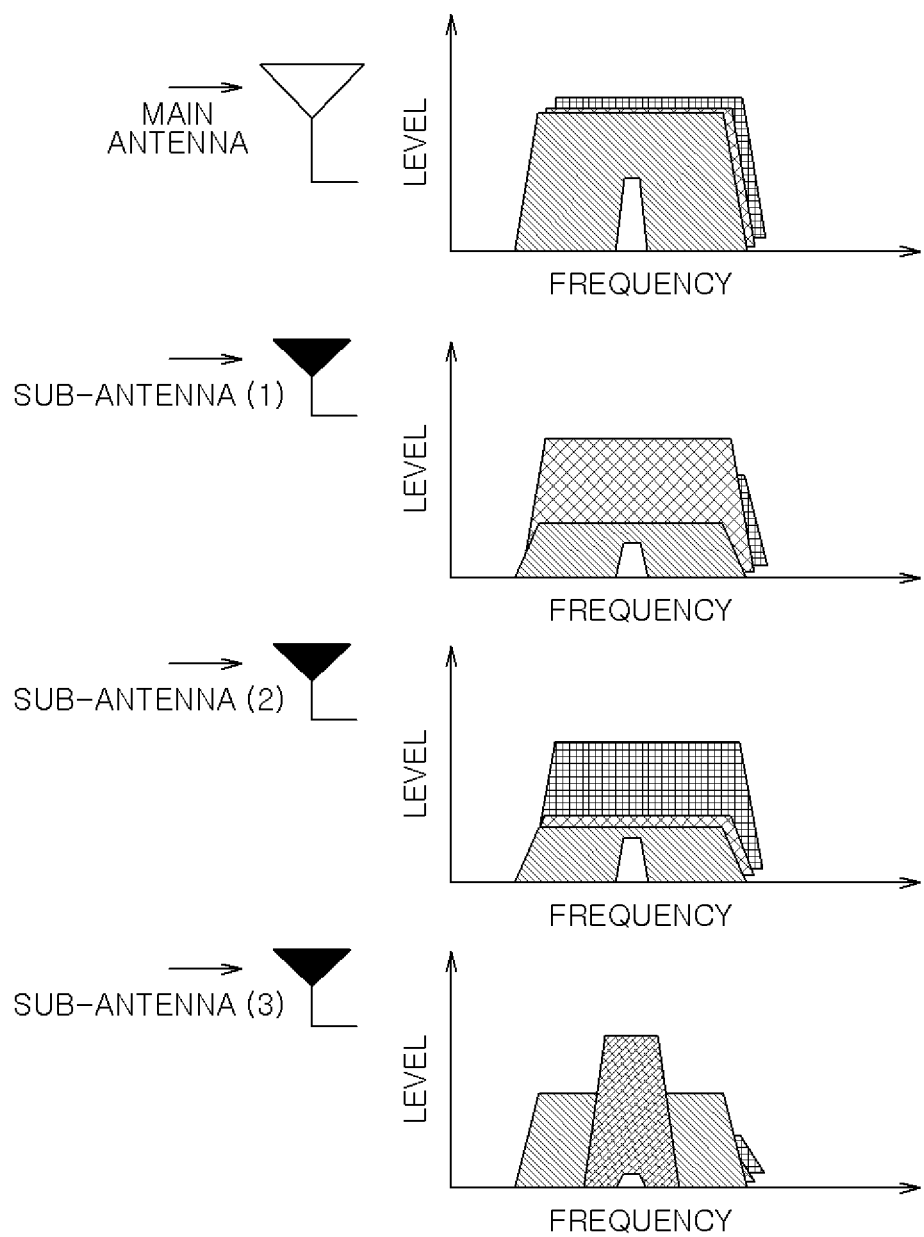

SIGNAL OBTAINED AFTER SYNTHESIZING INTERFERENCE SIGNALS

SIGNAL OBTAINED AFTER SYNTHESIZING INTERFERENCE SIGNALS
(IN THE CASE OF INPUTTING SIGNALS OTHER THAN
INTERFERENCE SIGNALS TO BE CANCELLED)

SIGNAL OBTAINED AFTER SYNTHESIZING INTERFERENCE SIGNALS
(IN THE CASE OF STOPPING SYNTHESIZING IN A SUB-ANTENNA 3
(ANTENNA TO WHICH SIGNALS OTHER THAN INTERFERENCE
SIGNALS TO BE CANCELED ARE INPUTTED)

REPLICA SIGNAL GENERATION

REPLICA SIGNAL GENERATION
(IN THE CASE OF INPUTTING SIGNALS OTHER THAN
INTERFERENCE SIGNALS TO BE CANCELED)

SIGNAL OBTAINED AFTER CANCELLING INTERFERENCE SIGNALS

SIGNAL OBTAINED AFTER CANCELLING INTERFERENCE SIGNALS
(IN THE CASE OF INPUTTING SIGNALS OTHER THAN
INTERFERENCE SIGNALS TO BE CANCELED)

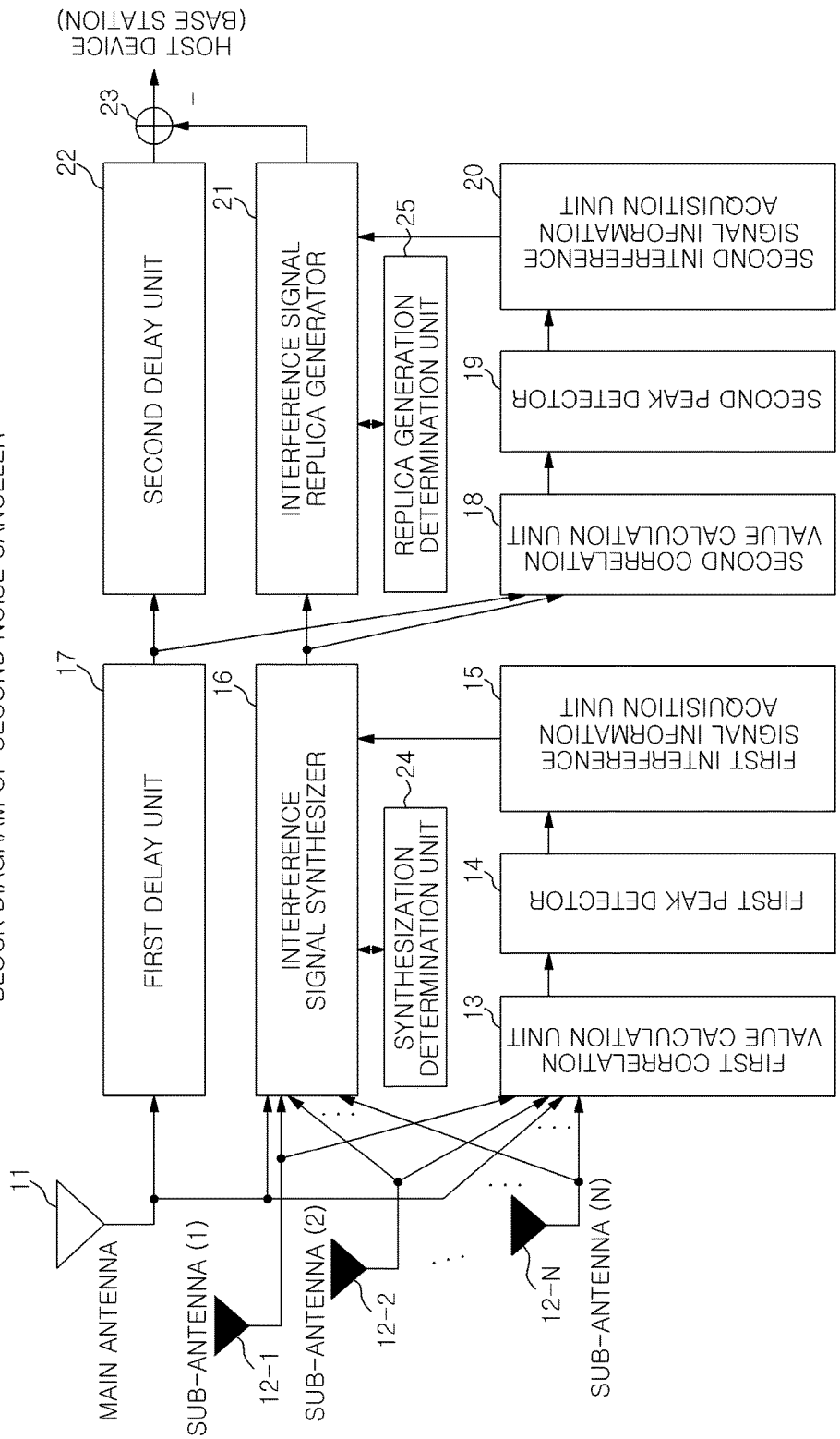

BLOCK DIAGRAM OF THIRD NOISE CANCELER

BLOCK DIAGRAM OF FOURTH NOISE CANCELER

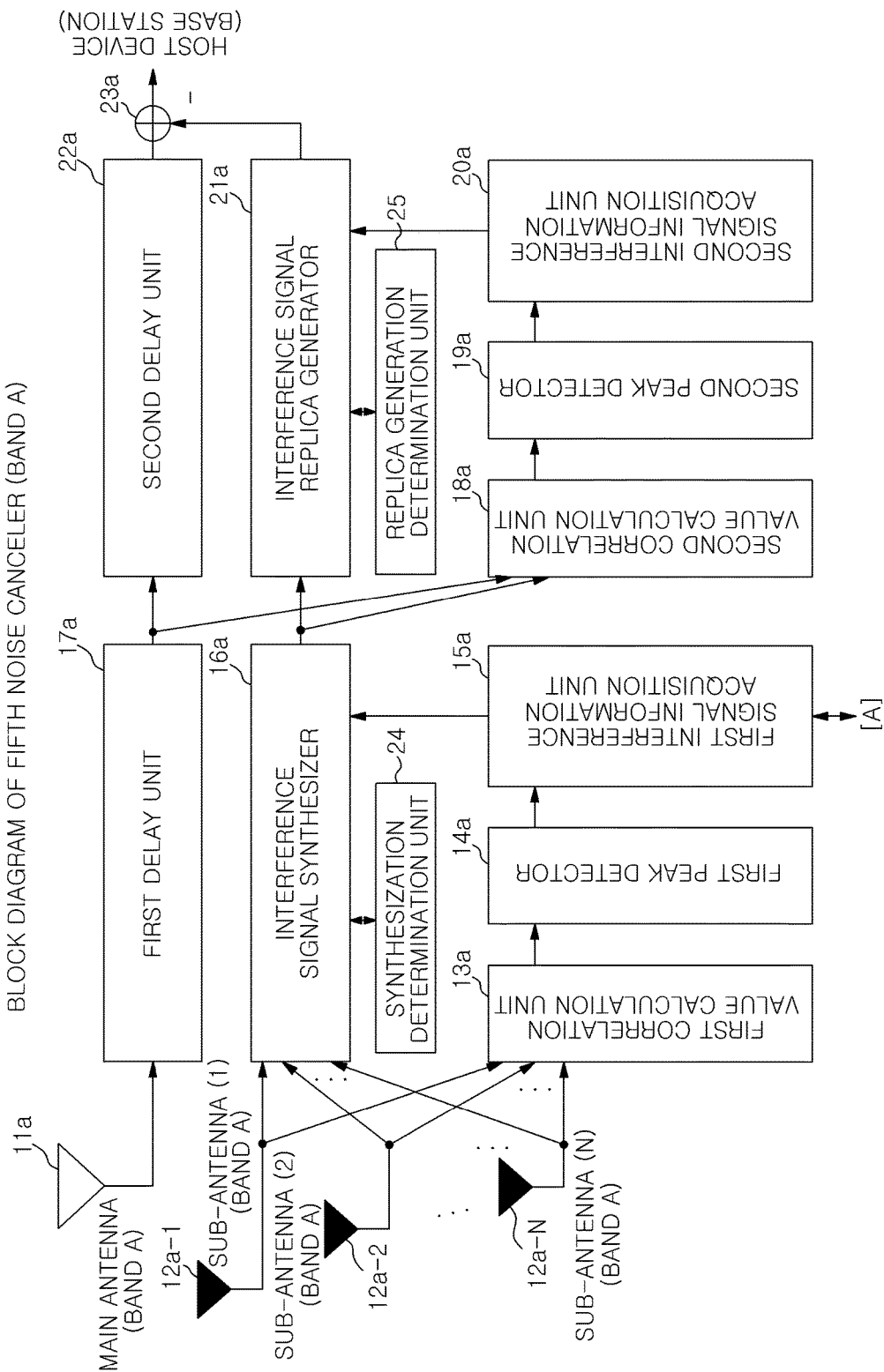

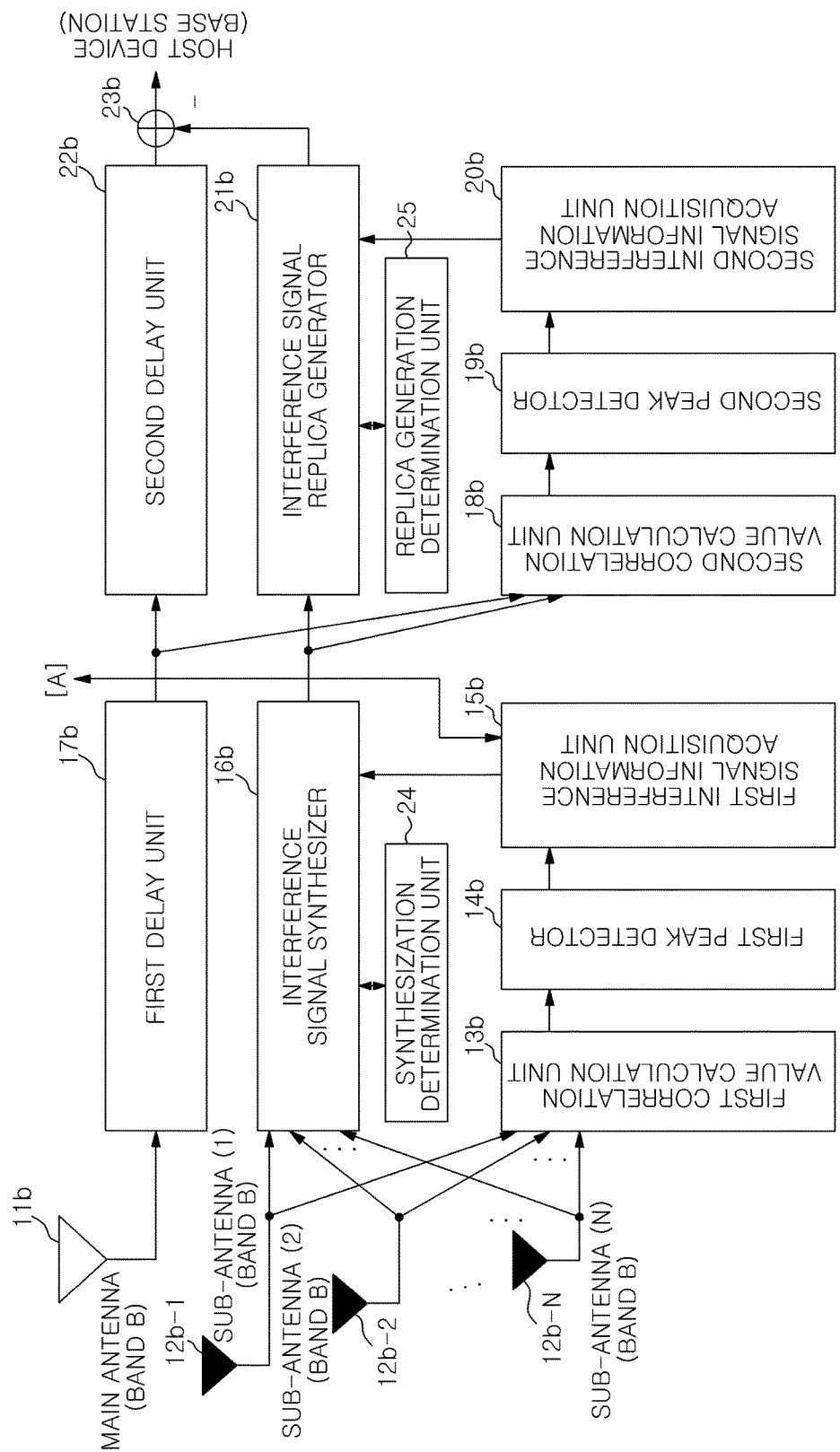
FIG. 11 BLOCK DIAGRAM OF FIFTH NOISE CANCELER (BAND B)

NOISE CANCELER

FIELD OF THE INVENTION

The present invention relates to a noise canceler in a wireless communication system; and, more particularly, to a noise canceler capable of removing interference signals from other systems.

BACKGROUND OF THE INVENTION

In a conventional wireless communication system, a communication environment may deteriorate because a signal of another system becomes an interference signal for a desired signal.

For example, in broadcasting satellite reception equipment having a BS (broadcasting satellite) antenna installed in each house, frequency conversion is often used to process a received signal. If radio waves leak from the reception equipment at that time, a band of a cell phone is interfered.

A signal band as an interference signal for a band of a cell phone as a desired signal is wider than the band of the cell phone, it is difficult to remove the interference signal by a filter or the like. A known interference signal can be removed by generating a replica as a reference. However, when it is not possible to prepare a replica of the interference signal, it is difficult to remove only the interference signal.

As for a related prior art, there is Japanese Patent Application Publication No. 2009-272767 "interference wave canceler relay device" (Hitachi Kokusai Electric Inc.) (Patent Document 1).

In Patent Document 1, the interference wave canceler relay device allows a filter factor of a complex FIR filter unit required for a diffracted wave canceler to be updated accurately.

Patent Document 1: Japanese Patent Application Publication No. 2009-272767

However, in the conventional wireless communication system for a cell phone, the interference signal from another system such as the broadcasting satellite reception equipment having a BS antenna may not be removed, which results in deterioration of a communication quality of a cell phone as a desired signal.

In Patent Document 1, the diffracted wave is canceled and, thus, the interference signal from another system is not removed.

SUMMARY OF THE INVENTION

In view of the above, the disclosure provides a noise canceler capable of improving a communication quality of a desired signal by removing an interference signal from another system.

In accordance with an aspect, there is provided a noise canceler including: an interference signal synthesizer configured to acquire information on a plurality of received interference signals by performing cross-correlation processing on the plurality of received interference signals, synthesize the plurality of received interference signals based on the information and output the synthesized interference signal; a replica generator configured to acquire information on an interference signal included in a received signal by correlating the received signal and the synthesized interference signal and generate an interference signal replica based on the information; an interference signal removal unit configured to remove the interference signal by subtracting the interference signal replica from the received signal; and a synthesization determination unit configured to monitor characteristics of signals inputted into the interference signal synthesizer and controls the interference signal synthesizer not to synthesize a signal having predetermined characteristics among the monitored signals.

The synthesization determination unit may monitor a signal level as characteristics of signals inputted into the interference signal synthesizer at a long period average and a short period average and control the interference signal synthesizer not to perform the synthesization when the short period average is greater than the long period average by a predetermined threshold value or more.

The synthesization determination unit may monitor frequency characteristics as characteristics of signals inputted into the interference signal synthesizer and control the interference signal synthesizer not to perform the synthesization when the frequency characteristics are greater than a predetermined signal level of a signal in a narrow band other than a predetermined cancel target signal.

In accordance with another aspect, there is provided a noise canceler including: an interference signal synthesizer configured to acquire information on a plurality of received interference signals by performing cross-correlation processing on the plurality of received interference signals, synthesize the plurality of received interference signals based on the information and output the synthesized interference signal; a replica signal generator configured to acquire information on an interference signal included in a received signal by correlating the received signal and the synthesized interference signal and generate an interference signal replica based on the information; an interference signal removal unit configured to remove the interference signal by subtracting the interference signal replica from the received signal; and a replica generation determination unit configured to monitor characteristics of the interference signal replica generated by the interference signal replica generator and control the interference signal replica generator not to output the interference signal replica to the interference signal removal unit when the monitored signal is a signal having predetermined characteristics.

The replica generation determination unit may monitor a signal level as characteristics of the interference signal replica generated by the interference signal replica generator at a long period average and a short period average and control the interference signal replica generator not to performed the output when the short period average is greater than the long period average by a predetermined threshold value or more.

The replica generation determination unit may monitor frequency characteristics and a signal level as characteristics of the interference signal replica generated by the interference signal replica generator and control the interference signal replica generator not to perform the output when the frequency characteristics are greater than a predetermined signal level of a signal in a narrow band other than a predetermined cancel target signal.

The noise canceler may further include antennas for receiving the plurality of interference signals, and the antennas may include a main antenna and one or more sub-antennas.

The noise canceler may further include antennas for receiving the plurality of interference signals, and the antennas may include a plurality of sub-antennas.

At least one of the sub-antennas may have directivity for the interference signals.

In accordance with still another aspect, there is provided a noise canceler including: an interference signal synthesizer configured to acquire information on a plurality of interference signals included in a received signal by performing self correlation processing on the plurality of interference signals, synthesize the plurality of interference signals based on the information and output the synthesized interference signal; an interference signal replica generator configured to acquire information on an interference signal included in the received signal by correlating the received signal and the synthesized interference signal and generate an interference signal replica based on the information; an interference signal removal unit configured to remove the interference signal by subtracting the interference signal replica from the received signal; and a synthesization determination unit configured to monitor characteristics of signals inputted into the interference signal synthesizer and prevent a signal having predetermined characteristics among the monitored signals from being synthesized.

The synthesizing determination unit may monitor a signal level as characteristics of signals inputted into the interference signal synthesizer at a long period average and a short period average and control the interference signal synthesizer not to perform the sythesization when the short period average is greater than the long period average by a predetermined threshold value or more.

The synthesizing determination unit may monitor frequency characteristics and a signal level as characteristics of signals inputted into the interference signal synthesizer and control the interference signal synthesizer not to perform the sythesization when the frequency characteristics are greater than a predetermined signal level of a signal in a narrow band other than a predetermined cancel target signal.

In accordance with still another aspect, there is provided a noise canceler including: an interference signal synthesizer configured to acquire information on a plurality of interference signals included in a received signal by performing self correlation processing on the plurality of interference signals, synthesize the plurality of interference signals included in the received signal based on the information, and output the synthesized interference signal; an interference signal replica generator configured to acquire information on an interference signal included in the received signal by correlating the received signal and the synthesized interference signal and generate an interference signal replica based on the information; an interference signal removal unit configured to remove the interference signal by subtracting the interference signal replica from the received signal; and a replica generation determination unit configured to monitor characteristics of the interference signal replica generated by the interference signal replica generator and prevent the interference signal replica from being outputted to the interference signal removal unit when the monitored signal is a signal having predetermined characteristics.

The replica generation determination unit may monitor a signal level as characteristics of the interference signal replica generated by the interference signal replica generator at a long period average and a short period average and control the interference signal replica generator not to perform the output when the short period average is greater than the long period average by a predetermined threshold value or more.

The replica generation determination unit may monitor frequency characteristics and a signal level as characteristics of the interference signal replica generated in the interference signal replica generator and control the interference signal replica generator not to perform the output when the frequency characteristics are greater than a predetermined signal level of a signal in a narrow band other than a predetermined cancel target signal.

The noise canceler may further include an antenna for receiving a signal, and the antenna may include a main antenna, or a main antenna and a sub-antenna.

Among the noise cancelers described above, by arbitrarily combining a plurality of noise cancelers for each band, the information on the interference signal in the interference signal synthesizer is shared and the information determined to have high accuracy or the information having a high reception level among the information on the interference signal is used.

Effect of the Invention

In accordance with the noise canceler of the present invention, the communication quality of the desired signal can be improved by removing the interference signal from another system. Further, even when a signal other than a cancel target signal is inputted, the deterioration in the communication quality of the desired signal can be avoided.

In accordance with the noise canceler of the present invention, the interference signal can be removed from the received signal with high accuracy by using the information on the interference signal in another band. Further, even when a signal other than a cancel target signal is inputted, the deterioration in the communication quality of the desired signal can be avoided.

BRIEF DESCRIPTION OF THE DRAWINGS

FIG. 3A shows signals received by the antennas (in the case of inputting signals other than interference signals to be canceled).

FIG. 7 is a block diagram showing a configuration of a second noise canceler.

FIG. 10 is a block diagram showing a configuration of a fifth noise canceler (for band A).

FIG. 11 is a block diagram showing a configuration of the fifth noise canceler (for band B).

DETAILED DESCRIPTION OF THE EMBODIMENTS

Figure 1:
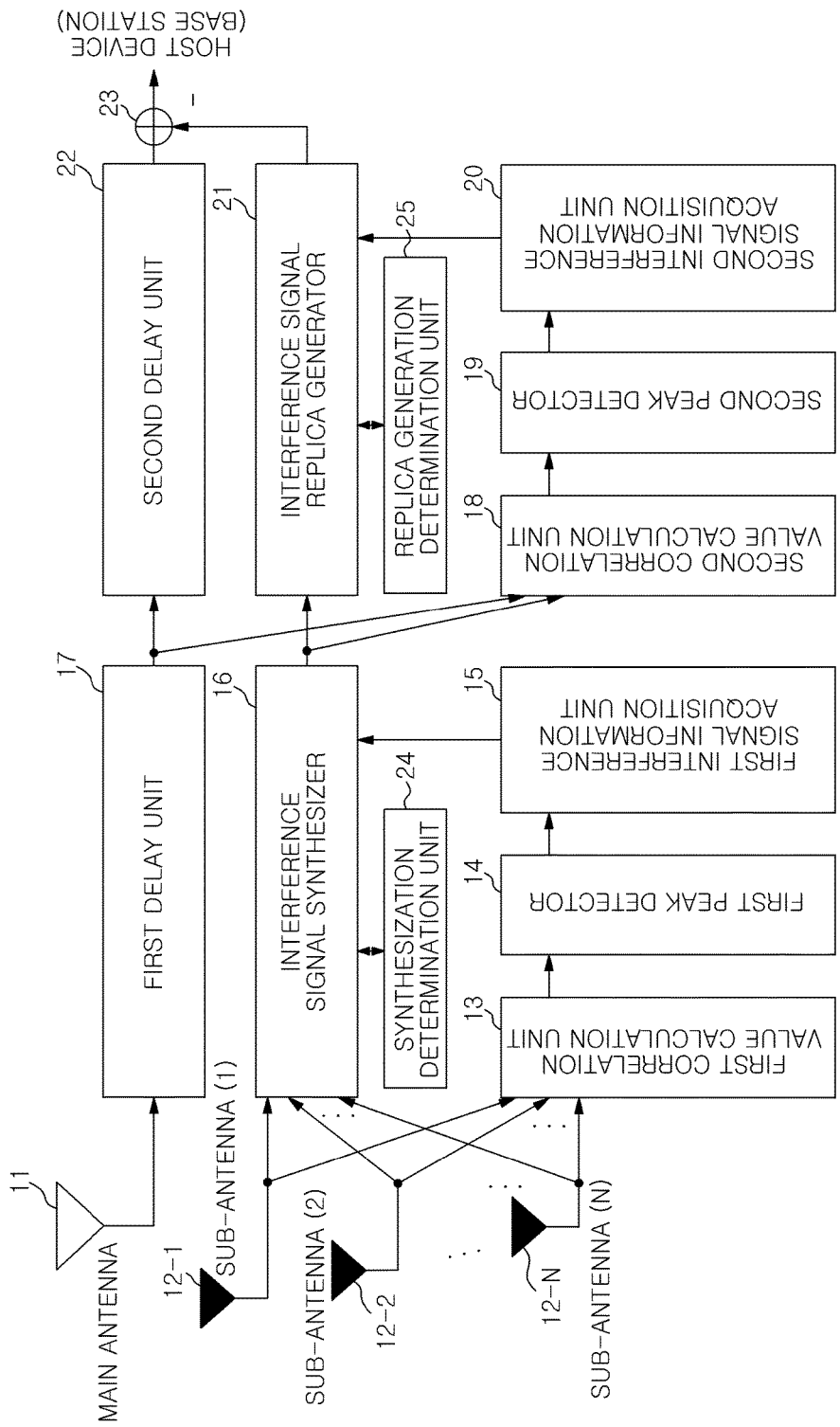
FIG. 1 is a block diagram showing a configuration of a first noise canceler.

Hereinafter, embodiments of the present invention will be described with reference to the accompanying drawings.

Outline of Embodiments

A noise canceler in accordance with an embodiment includes: an interference signal synthesizer configured to acquire information on a plurality of received interference signals by performing cross-correlation processing on the plurality of received interference signals, synthesize the plurality of received interference signals based on the information and output the synthesized interference signal; a replica generator configured to acquire information on an interference signal included in a received signal by correlating the received signal and the synthesized interference signal and generate an interference signal replica based on the information; an interference signal removal unit configured to remove the interference signal by subtracting the interference signal replica from the received signal; and a synthesization determination unit configured to monitor characteristics of signals inputted into the interference signal synthesizer and controls the interference signal synthesizer not to synthesize a signal having predetermined characteristics among the monitored signals. The communication quality of the desired signal can be improved by removing the interference signal from another system. Even when a signal other than the cancel target signal is inputted, the deterioration in the communication quality of the desired signal can be avoided.

Further, a noise canceler in accordance with an embodiment includes: an interference signal synthesizer configured to acquire information on a plurality of received interference signals by performing cross-correlation processing on the plurality of received interference signals, synthesize the plurality of received interference signals based on the information and output the synthesized interference signal; a replica signal generator configured to acquire information on an interference signal included in a received signal by correlating the received signal and the synthesized interference signal and generate an interference signal replica based on the information; an interference signal removal unit configured to remove the interference signal by subtracting the interference signal replica from the received signal; and a replica generation determination unit configured to monitor characteristics of the interference signal replica generated by the interference signal replica generator and control the interference signal replica generator not to output the interference signal replica to the interference signal removal unit when the monitored signal is a signal having predetermined characteristics. The communication quality of the desired signal can be improved by removing the interference signal from another system. Even when a signal other than the cancel target signal is inputted, the deterioration in the communication quality of the desired signal can be avoided.

Further, a noise canceler in accordance with an embodiment includes: an interference signal synthesizer configured to acquire information on a plurality of interference signals included in a received signal by performing self correlation processing on the plurality of interference signals, synthesize the plurality of interference signals based on the information and output the synthesized interference signal; an interference signal replica generator configured to acquire information on an interference signal included in the received signal by correlating the received signal and the synthesized interference signal and generate an interference signal replica based on the information; an interference signal removal unit configured to remove the interference signal by subtracting the interference signal replica from the received signal; and a synthesization determination unit configured to monitor characteristics of signals inputted into the interference signal synthesizer and prevent a signal having predetermined characteristics among the monitored signals from being synthesized. The communication quality of the desired signal can be improved by removing the interference signal from another system. Even when a signal other than the cancel target signal is inputted, the deterioration in the communication quality of the desired signal can be avoided.

Further, a noise canceler in accordance with an embodiment includes: an interference signal synthesizer configured to acquire information on a plurality of interference signals included in a received signal by performing self correlation processing on the plurality of interference signals, synthesize the plurality of interference signals included in the received signal based on the information, and output the synthesized interference signal; an interference signal replica generator configured to acquire information on an interference signal included in the received signal by correlating the received signal and the synthesized interference signal and generate an interference signal replica based on the information; an interference signal removal unit configured to remove the interference signal by subtracting the interference signal replica from the received signal; and a replica generation determination unit configured to monitor characteristics of the interference signal replica generated by the interference signal replica generator and prevent the interference signal replica from being outputted to the interference signal removal unit when the monitored signal is a signal having predetermined characteristics. The communication quality of the desired signal can be improved by removing the interference signal from another system. Even when a signal other than the cancel target signal is inputted, the deterioration in the communication quality of the desired signal can be avoided.

In the noise canceler according to an embodiment, a plurality of noise cancelers, among the noise cancelers described above, is combined for each band; the information on the interference signal in the interference signal synthesizer is shared; and the information determined to have high accuracy or the information having a high reception level among the information on the interference signal is used. Accordingly, the interference signal can be removed from the received signal with high accuracy by using the information on the interference signal in another band. Even when a signal other than the cancel target signal is inputted, the deterioration in the communication quality of the desired signal can be avoided.

(First Noise Canceler: FIG. 1)

A first noise canceler according to an embodiment of the present invention will be described with reference to FIG. 1. FIG. 1 is a block diagram showing a configuration of the first noise canceler.

As shown in FIG. 1, the first noise canceler includes: a main antenna 11 and a plurality of sub-antennas 12 which constitute an antenna unit; a first correlation value calculation unit 13, a first peak detector 14, a first interference signal information acquisition unit 15 and an interference signal synthesizer 16 which constitute an interference signal synthesizer; a first delay unit 17 for delaying a signal from the main antenna 11; a second correlation value calculation unit 18, a second peak detector 19, a second interference signal information acquisition unit 20 and an interference signal replica generator 21 which constitute an interference signal replica generator; a second delay unit 22 for delaying a signal from the first delay unit 17; and an interference signal removal unit 23. In the block diagram showing the configuration of the first noise canceler, there are further illustrated a synthesization determination unit 24 as an interference signal synthesizer and a replica generation determination unit 25 as an interference signal replica generator. However, there may be provided both or one of the synthesization determination unit 24 and the replica generation determination unit 25.

(Components of the First Noise Canceler)

Hereinafter, the respective components of the first noise canceler will be described in detail.

(Main Antenna 11)

The main antenna 11 is an antenna for receiving a desired signal, specifically a wireless signal of a cell phone. However, an interference signal from another system (leakage signal from a BS antenna) is mixed therewith.

(Sub-Antennas 12)

The sub-antennas 12 (12-1, 12-2, . . . , 12-N) are antennas for receiving interference signals and connected to the first correlation value calculation unit 13 and the interference signal synthesizer 16.

The sub-antennas 12 receive not only the interference signals but also a desired signal or other signals. In the case of providing a plurality of sub-antennas, the interference signal cancel effect can be improved by increasing the accuracy of the interference signal by using a plurality of received signals.

Each of the sub-antennas 12 receives the interference signals from several interference sources. Therefore, the signals that are different in a reception level, delay time or the like are received from the respective interference sources by changing positions or angles of a plurality of the sub-antennas 12.

(First Correlation Value Calculation Unit 13)

The first correlation value calculation unit 13 receives the signals from all the sub-antennas 12 and calculates a correlation value by changing the delay time or the frequency between the respective input signals. The correlation processing in the first correlation value calculation unit 13 is a cross-correlation processing.

(First Peak Detector 14)

The first peak detector 14 detects a peak of an input signal based on the correlation value calculated in the first correlation value calculation unit 13 and detects an interference signal.

(First Interference Signal Information Acquisition Unit 15)

The first interference signal information acquisition unit 15 acquires the information on delay time (timing information), a phase, and a signal level of the interference signal detected in the first peak detector 14 as the interference signal information and outputs the information to the interference signal synthesizer 16.

When the peak is not detected in the peak detector 14, the signal levels of the signals received by the sub-antennas 12 are measured and outputs an instruction for selecting a sub-antenna 12 that has received an input signal having a highest signal level to the interference signal synthesizer 16.

(Interference Signal Synthesizer 16)

When the interference signal information is inputted from the first interference signal information acquisition unit 15, the interference signal synthesizer 16 synthesizes the interference signals while matching phases and timing of the interference signals inputted from the sub-antennas based on the information and outputs the synthesized signal to the second correlation value calculation unit 18 and the interference signal replica generator 21.

When the instruction for selecting the sub-antenna 12 is inputted, the interference signal synthesizer 16 outputs the signal received by the selected sub-antenna 12 to the second correlation value calculation unit 18 and the interference signal replica generator 21 without performing the interference signal synthesizing process.

(Synthesization Determination Unit 24)

The synthesization determination unit 24 determines whether to synthesize the interference signals in the interference signal synthesizer 16.

The interference signal synthesizer 16 synthesizes the interference signals in order to increase the accuracy of the replica of the interference signal which is generated by the interference signal replica generator 21. When a signal other than a removal target signal is inputted into the sub-antenna at a high level, for example, the interference signal cancel effect may be higher in the case of not synthesizing signals in the corresponding sub-antenna.

The synthesization determination unit 24 determines the above-described condition and outputs an instruction for determining whether to synthesize signals from a specific antenna to the interference signal synthesizer 16.

(First Delay Unit 17)

The first delay unit 17 delays a desired signal from the main antenna 11 while considering the processing in the interference signal synthesizer 16 and outputs the delayed signal to the second correlation value calculation unit 18 and the second delay unit 22.

In other words, the first delay unit 17 performs the delay operation to match with the output timing of the interference signal synthesizer 16.

(Second Correlation Value Calculation Unit 18)

The second correlation value calculation unit 18 receives a desired signal from the first delay unit 17 and the synthesized interference signal from the interference signal synthesizer 16 (or interference signal received by the selected sub-antenna 12 (interference signal having a highest signal level)) and calculates a correlation value by correlating the signals by changing the delay time or the frequency thereof.

(Second Peak Detector 19)

The second peak detector 19 detects a peak of an input signal based on the correlation value calculated in the second correlation value calculation unit 18 and detects an interference signal from the signal received by the main antenna 11.

(Second Interference Signal Information Acquisition Unit 20)

The second interference signal information acquisition unit 20 acquires the information on delay time (timing information), a phase, a signal level or the like of the interference signal which is detected by the second peak detector 19 as the interference signal information and outputs the acquired information to the interference signal replica generator 21.

(Interference Signal Replica Generator 21)

The interference signal replica generator 21 generates a replica of the interference signal based on the interference signal information inputted from the second interference signal information acquisition unit 20 and outputs the replica to the interference signal removal unit 23.

The components of the interference signals are originally the same regardless of the interference sources. Therefore, once the interference signal replica generator 21 reproduces a signal from one of the interference sources as a replica by using the interference signal information, the interference signal replicas of other interference sources can also be reproduced.

(Replica Generation Determination Unit 25)

The replica generation determination unit 25 determines whether to generate a replica of an interference signal in the interference signal replica generator 21 or controls the interference signal replica generator 21 not to output the generated replica of the interference signal to the interference signal removal unit 23 to be described later.

The interference signal replica generator 21 has a function of generating a replica of an interference signal. When a signal other than a removal target signal is inputted into the sub-antenna at a high level, for example, the accuracy of the replica of the interference signal to be canceled is low and a high cancel effect may not be obtained.

The replica generation determination unit 25 determines the above-described condition and outputs an instruction for determining whether to generate a replica signal to the interfe generator 21 or an instruction for determining whether to transmit the generated replica of the interference signal to the interference signal removal unit 23 to be described later.

(Second Delay Unit 22)

The second delay unit 22 delays a desired signal from the first delay unit 17 while considering the processing in the interference signal replica generator 21 and outputs the delayed signal to the interference signal removal unit 23.

In other words, the second delay unit 22 performs the delay operation to match with the output timing of the interference signal replica generator 21.

(Interference Signal Removal Unit 23)

The interference signal removal unit 23 extracts a desired signal by removing (subtracting) the signal outputted from the interference signal replica generator 21 (replica of interference signal) from the signal outputted from the second delay unit 22, i.e., by removing the replica of the interference signal from the signal received by the main antenna 11, and outputs the extracted desired signal to a host device (e.g., base station).

(Noise Cancel Method)

A noise cancel method in the first noise canceler will be described with reference to FIGS. 1 to 6.

Figure 2:
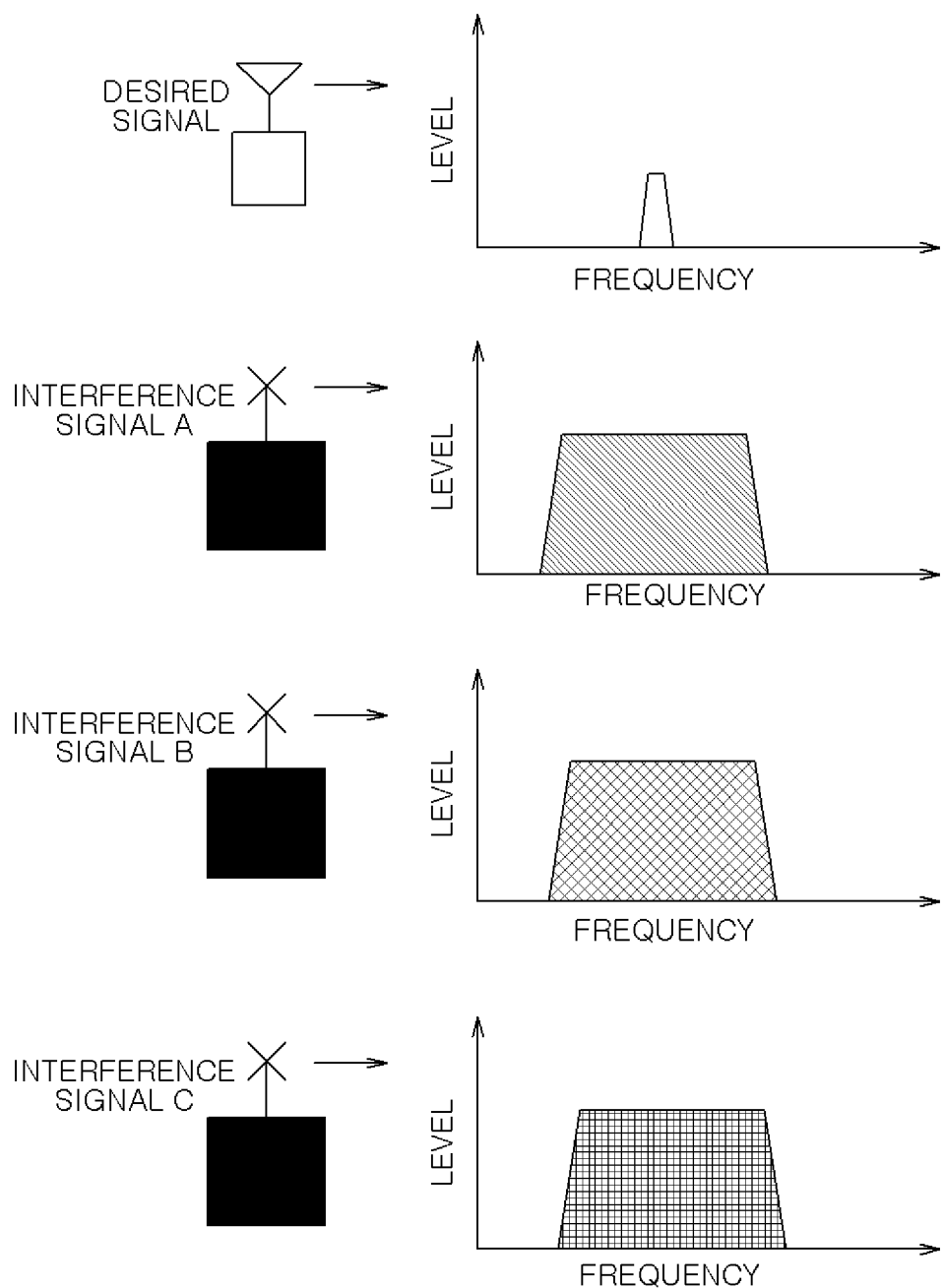
FIG. 2 shows a desired signal and interference signals.

(Desired Signal and Interference Signal: FIG. 2)

First, a desired signal and interference signals will be described with reference to FIG. 2. FIG. 2 shows the desired signal and the interference signals.

As shown in FIG. 2, there are three interference sources for a desired signal. The interference signals A to C have the same components but differ in delay time, phase, frequency or the like.

Figure 3:
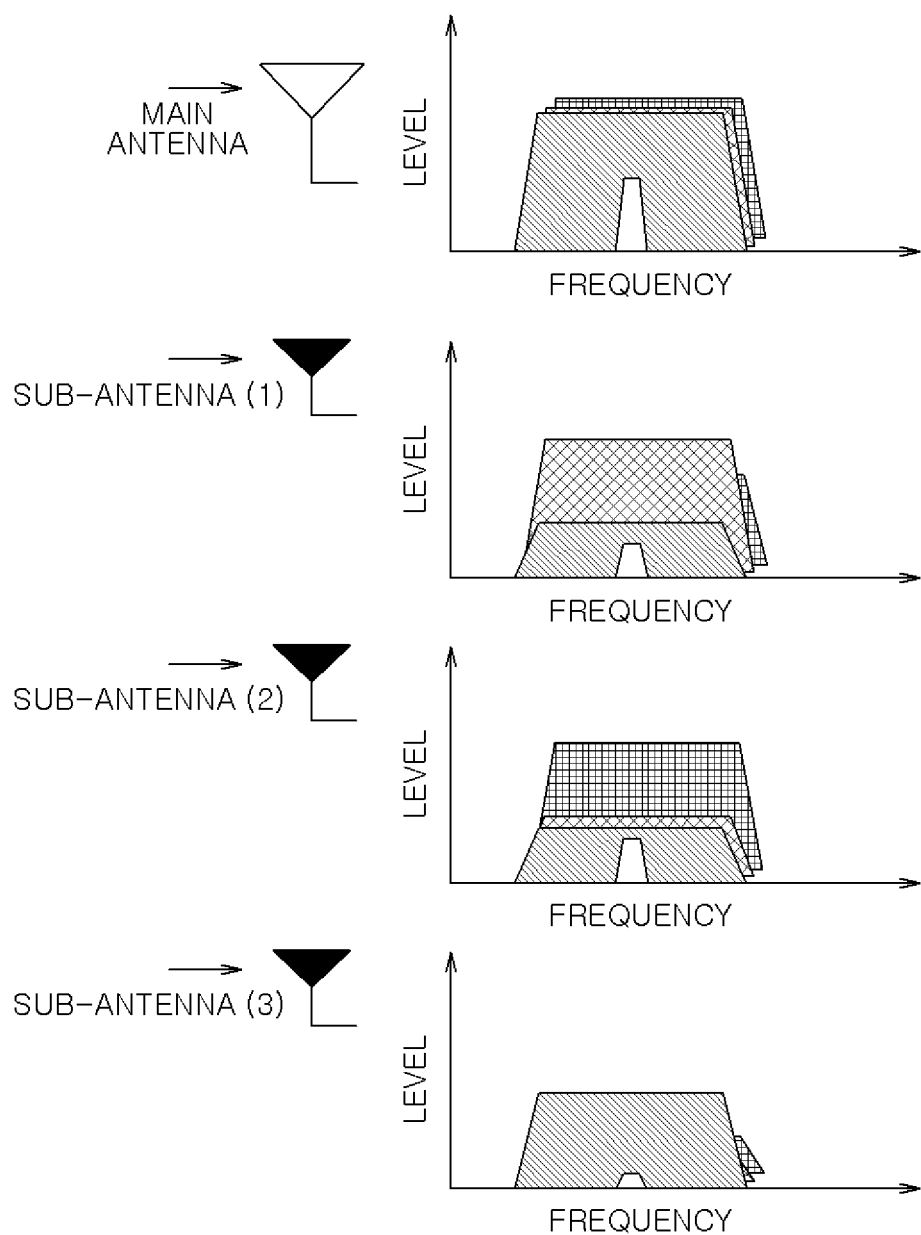
FIG. 3 shows signals received by antennas.

(Signals Received by the Respective Antennas: FIG. 3)

FIG. 3 shows a state in which the desired signal and the interference signals shown in FIG. 2 are received by the respective antennas. FIG. 3 shows the signals received by the respective antennas.

As shown in FIG. 3, the main antenna and the sub-antennas 1 to 3 receive the desired signal and the interference signals A to C. The signals received by the respective antennas have different reception levels, delay time or the like.

The signals received by the sub-antenna 1 (12-1), the sub-antenna 2 (12-2) and the sub-antenna 3 (12-3) are inputted into the first correlation value calculation unit 13. The first correlation value calculation unit 13 calculates a correlation value by cross-correlating the signals and outputs the correlation value to the first peak detector 14.

The first peak detector 14 detects peaks of the signals received by the sub-antennas 12 from the correlation value calculated in the first correlation value calculation unit 13 and detects the interference signal.

The first interference signal information acquisition unit 15 acquires the information (interference signal information) on the timing, the phase and the reception level of the interference signal from the peak information of the interference signal and outputs the acquired information to the interference signal synthesizer 16. When the information on the interference signal is not acquired, the instruction for selecting the sub-antenna 12 having a highest reception level is outputted to the interference signal synthesizer 16.

The interference signal synthesizer 16 synthesizes the signals inputted from the sub-antennas 12 while matching the timing and the phase of the interference signals based on the interference signal information from the first interference signal information acquisition unit 15 and synthesizes the interference signals.

When the instruction for selecting the sub-antenna 12 having a highest reception level is received, the interference signal synthesizer 16 outputs the signal received by the corresponding sub-antenna 12 to the second correlation value calculation unit 18 and the interference signal replica generator 21.

Figure 4:
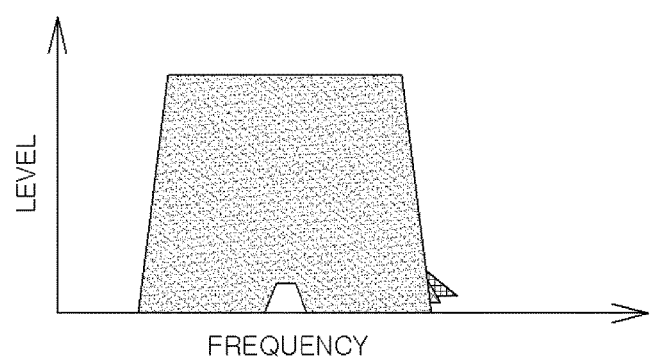
FIG. 4 shows a signal obtained after synthesizing interference signals.

(Signal Obtained After Synthesizing Interference Signals: FIG. 4)

A signal obtained after synthesizing the interference signals in the interference signal synthesizer 16 will be described with reference to FIG. 4. FIG. 4 shows the signal obtained after synthesizing the interference signals.

As shown in FIG. 4, when the interference signals are synthesized based on the interference signal information, a signal of a single interference source is emphasized.

Here, the case of inputting signals other than interference signals to be canceled will be described.

(Signals Received by Antennas (in the Case of Inputting Signals Other Than Interference Signals to be Canceled: FIG. 3A))

FIG. 3A shows a state in which a desired signal and interference signals are received by the antennas in the case of inputting signals other than the interference signals to be canceled.

Figure 4A:
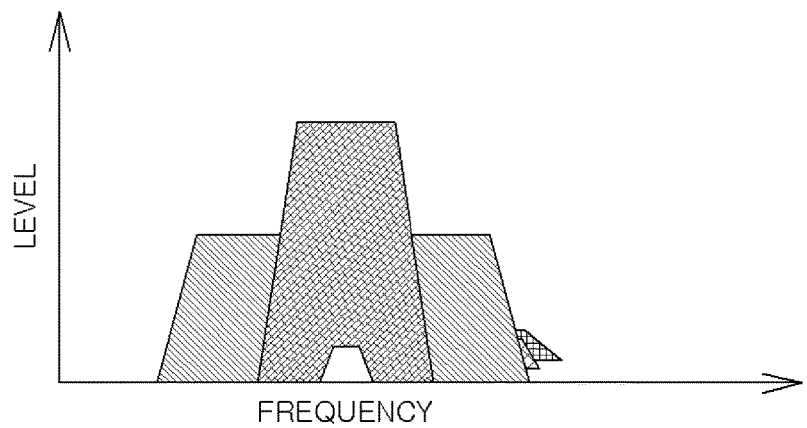
FIG. 4A shows a signal obtained after synthesizing the interference signals (in the case of inputting signals other than the interference signals to be canceled).

(Signal Obtained After Synthesizing Interference Signals (in the Case of Inputting Signals Other Than Interference Signals to be Canceled): FIG. 4A)

A signal obtained after synthesizing the interference signals in the interference signal synthesizer 16 will be described with reference to FIG. 4A. FIG. 4A shows the signal obtained after synthesizing the interference signals in the case of inputting signals other than the interference signals to be canceled into the sub-antenna 3. Unlike the signal shown in FIG. 4 which is obtained after synthesizing the interference signals shown in FIG. 3, the interference signals to be canceled are not emphasized as shown in FIG. 4A. This is because the signals other than the interference signals to be canceled are synthesized.

Figure 4B:
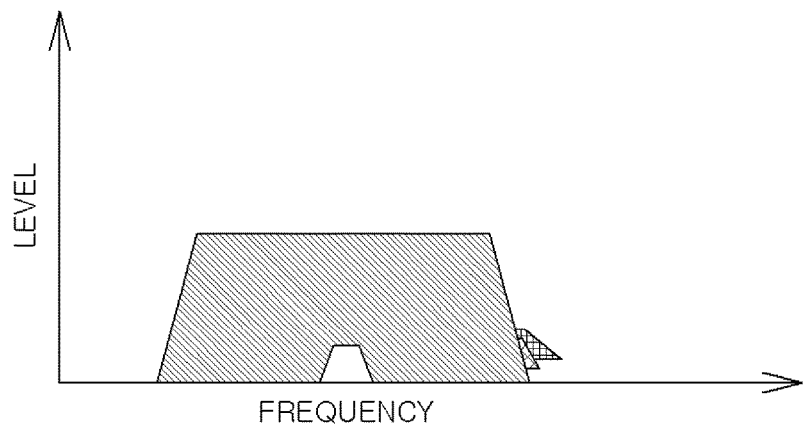
FIG. 4B shows a signal obtained after synthesizing the interference signals (in the case of stopping synthesizing in a sub-antenna 3 (antenna to which signals other than the interference signals to be canceled are inputted).

(Signal Obtained After Synthesizing Interference Signals (in the Case of Stopping Synthesizing in the Sub-Antenna 3): FIG. 4B)

A signal obtained after synthesizing the interference signals in the interference signal synthesizer 16 will be described with reference to FIG. 4B in order to deal with the case in which the signal of the interference source as a cancel target is not emphasized as shown in FIG. 4A because the signals other than the interference signals to be canceled are synthesized. FIG. 4B shows, when signals other than the interference signals to be canceled are inputted into the sub-antenna 3, a signal obtained after synthesizing the interference signals without synthesizing the signals inputted in the sub-antenna 3 with an input signal from another antenna. Unlike the signal obtained after synthesizing the interference signals which is shown in FIG. 4A, a signal of a single interference source is emphasized as shown in FIG. 4B.

The synthesization determination unit 24 determines a condition for emphasizing the signal of the interference source to be canceled and outputs an instruction to the interference signal synthesizer 16. In other words, in the case shown in FIG. 3A, it is determined not to synthesize the input signal of the sub-antenna 3. Accordingly, the signal of the single interference source is emphasized after the signal synthesis. When the interference signals to be canceled are not inputted into the sub-antenna 3, the sub-antenna 3 may be used for synthesizing the interference signals.

As for the determination method of the synthesization determination unit 24, a method using characteristics of the interference signals to be canceled may be considered. For example, when the interference signal to be canceled is a broadband signal and exists normally as in the case of a leakage signal of a BS antenna, the reception level of each sub-antenna is monitored at a long period average and a short period average and a threshold value is set. When the short period average is greater than the long period average by the threshold value or more, it is determined that the signal other than the cancel target signal is inputted instantaneously and the synthesizing operation in the sub-antenna is not performed.

In addition, the frequency characteristics of the signals received by the sub-antennas are monitored and threshold values thereof are set. When the frequency characteristics are greater than the threshold value in a certain frequency band, it is determined that a signal in a narrow band other than the cancel target signal is inputted and the synthesizing operation in the corresponding sub-antenna may not be performed.

Although the case of providing the synthesization determination unit 24 and inputting the signals other than the interference signals to be canceled has been described, the synthesization determination unit 24 may not be provided and the case of inputting the signals other than the interference signals to be canceled may be dealt with by the replica generation determination unit 25 to be described later, or both of the synthesization determination unit 24 and the replica generation determination unit 25 may be used.

The function of the synthesization determination unit 24 may be realized by the first correlation value calculation unit 13, the first peak detector 14 and the first interference signal information acquisition unit 15.

The second correlation value calculation unit 18 receives the signal from the first delay unit 17 (signal received by the main antenna 11) and the signal from the interference signal synthesizer 16 (signal obtained after synthesizing the interference signals or the like), calculates a correlation value by correlating the signals, and outputs the correlation value to the second peak detector 19.

The second peak detector 19 detects the peak of the interference signal based on the correlation value from the second correlation value calculation unit 18 and outputs the peak information to the second interference signal information acquisition unit 20.

The second interference signal information acquisition unit 20 acquires the information (interference signal information) on the timing, the phase and the reception level of the interference signal from the peak information of the interference signal and outputs the acquired information to the interference signal replica generator 21.

The interference signal replica generator 21 generates replica signals of the interference signals A to C from the synthesized interference signals obtained by the interference signal synthesizer 16 at the timing and the phases of the interference signals based on the interference signal information from the second interference signal information acquisition unit 20 and outputs the generated replica signals to the interference signal removal unit 23.

Figure 5:
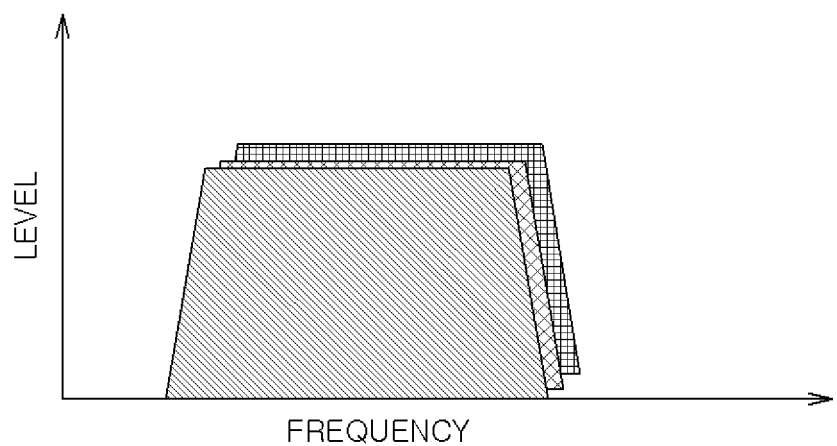
FIG. 5 shows a generated replica signal.

(Replica Signal: FIG. 5)

Examples of replica signals will be described with reference to FIG. 5. FIG. 5 shows the generated replica signals.

As shown in FIG. 5, the replica signals of the interference signals A to C are generated.

The components of the interference signals are originally the same regardless of the interference sources. Therefore, once a signal of a single interference source can be reproduced with high accuracy, the signals of other interference sources can be reproduced.

The interference signal removal unit 23 extracts a desired signal by removing the interference signal from the signal received by the main antenna 11 by subtracting the replica signal from the interference signal replica generator 21 from the signal from the second delay unit 22 (signal received by the main antenna 11) and outputs the extracted desired signal to a host device.

Figure 6:
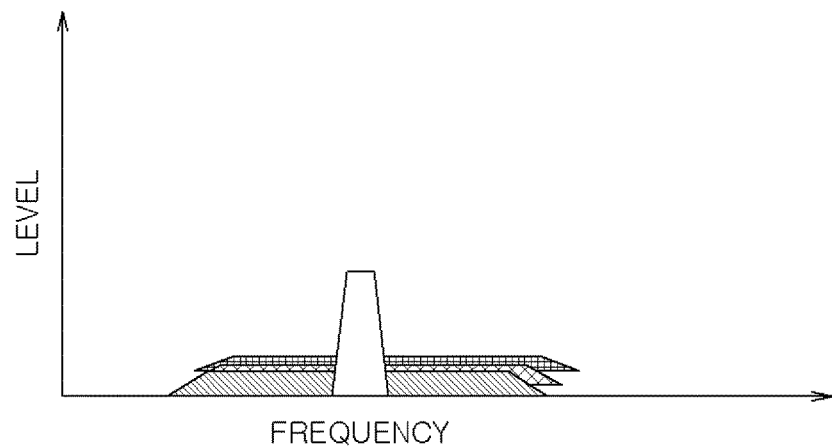
FIG. 6 shows a signal obtained after canceling interference signals.

(Signal Obtained After Canceling Interference Signals: FIG. 6)

A signal obtained after canceling interference signals will be described with reference to FIG. 6. FIG. 6 shows a signal obtained after canceling the interference signals.

As shown in FIG. 6, only the interference signal is removed from the signal received by the main antenna 11 by using the replica signal. Therefore, only the interference signal can be removed in a state where the desired signal remains.

Although the interference signal remains in FIG. 6, it is ideal that only the desired signal at the center remains.

Hereinafter, the case of inputting signals other than the interference signals to be canceled will be described. Here, the aforementioned synthesization determination unit 24 is not provided and the signal other than the interference signals to be canceled is inputted as the signal obtained after synthesizing the interference signals shown in FIG. 4A.

Figure 5A:
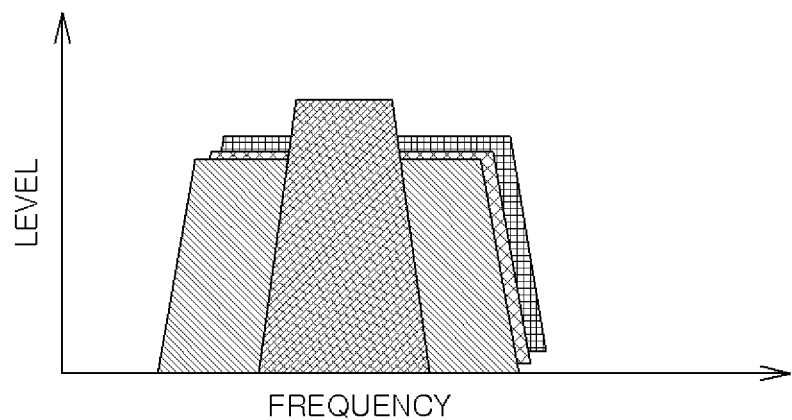
FIG. 5A shows a generated replica signal (in the case of inputting signals other than interference signals to be canceled).

(Replica Signal (in the Case of Inputting Signals Other Than Interference Signal to be Canceled): FIG. 5A)

An example of the replica signal in the case of inputting the signals other than the interference signals to be canceled will be described with reference to FIG. 5A. FIG. 5A shows the replica signal generated in the case of inputting the interference signal to be canceled and the signal other than the interference signal to be canceled into the interference signal replica generator 21.

Figure 6A:
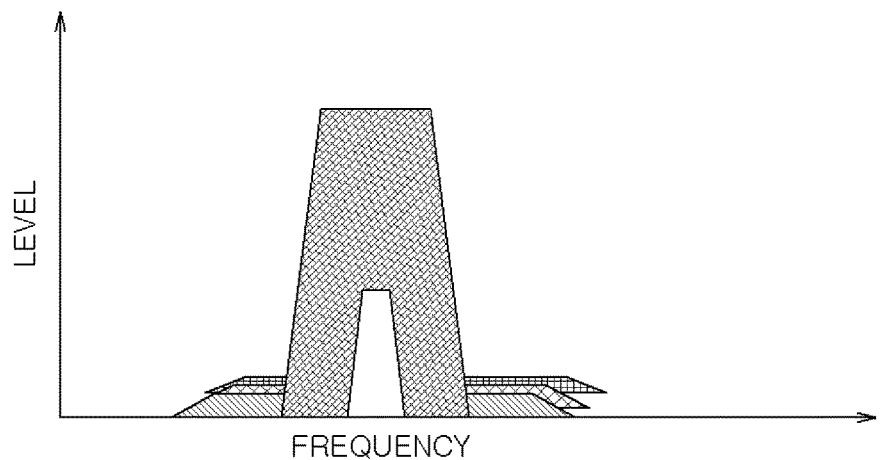
FIG. 6A shows a signal obtained after canceling the interference signals (in the case of inputting signals other than the interference signals to be canceled).

(Signal Obtained After Canceling Interference Signals (in the Case of Inputting Signals Other Than the Interference Signals to be Canceled): FIG. 6A)

A signal obtained canceling the interference signals in the case of inputting signals other than an interference signals to be canceled will be described with reference to FIG. 6A. FIG. 6A shows the signal obtained after canceling the interference signal in the case of inputting the signals other than the interference signal to be canceled. Unlike the signal shown in FIG. 6 which is obtained after canceling the interference signals by using the replica signal shown in FIG. 5, the signal shown in FIG. 6A which is obtained after canceling the interference signals by using the replica signal shown in FIG. 5A includes the signal other than the interference signal to be canceled and a quality of a desired signal deteriorates.

The replica generation determination unit 25 determines the above-described condition and does not perform the interference signal removal process when is assumed that the quality of the desired signal deteriorates due to the interference signal removal process. For example, an instruction of not generating the replica signal is outputted to the interference signal replica generator 21 when the determination can be made in the replica signal generation step, and an instruction of not outputting the generated replica signal is outputted to the interference signal replica generator 21 when the determination can be made by the replication signal generation. When it is determined that the quality of the desired signal does not deteriorate due to the interference signal removal process, the interference signal removal process is performed. Since the interference signal removal process is performed when the quality of the desired signal does not deteriorate in spite of the input of the interference signal to be canceled and the interference signal removal process is not performed when the quality of the desired signal deteriorates due to the input of the signal other than the cancel target signal, the deterioration in the quality of the desired signal can be prevented.

As for a determination method of the replica generation determination unit 25, a method using characteristics of the interference signals to be canceled may be considered. For example, when the interference signal to be canceled is a broadband signal and exists normally as in the case of a leakage signal of a BS antenna, the reception level of each sub-antenna is monitored at a long period average and a short period average and threshold values thereof are set. When the short period average is greater than the long period average by the threshold value or more, it is determined that the signal other than the cancel target signal is inputted instantaneously and the synthesizing operation in the sub-antenna is not performed. In addition, the frequency characteristics of the signals received by the sub-antennas are monitored and threshold values thereof are set. When the frequency characteristics are greater than the threshold value in a certain frequency band, it is determined that a signal in a narrow band other than the cancel target signal is inputted and the interference signal removal process may not be performed. The level in the case of removing the replica signal from the interference signal replica generator 21 by the interference signal removal unit 23 is virtually calculated. When the calculated level is greater than that of the signal from the second delay unit 22, it is determined that the quality of the desired signal deteriorates and the interference signal removal process may not be performed.

Although the case of providing the replica generation determination unit 25 and inputting the signals other than the interference signals to be canceled has been described, the replica generation determination unit 25 may not be provided and the case of inputting the signals other than the interference signals to be canceled may be dealt with by the aforementioned synthesization determination unit 24, or both of the synthesization determination unit 24 and the replica generation determination unit 25 may be used.

The function of the replica generation determination unit 25 may be realized by the second correlation value calculation unit 18, the second peak detector 19 and the second interference signal information acquisition unit 20.

(Effect of First Noise Canceler)

In accordance with the first noise canceler, the first correlation value calculation unit 13 calculates the correlation value by performing cross-correlation processing on the interference signals received by the sub-antennas 12; the first peak detector 14 detects the peak of the interference signal from the correlation value; the first interference signal information acquisition unit 15 acquires the interference signal information from the peak; the interference signal synthesizer 16 synthesizes the interference signals based on the interference signal information; the second correlation value calculation unit 18 calculates the correlation value by correlating the signal received by the main antenna 11 and the synthesized interference signal; the second peak detector 19 detects the peak from the correlation value; the second interference signal information acquisition unit 20 acquires the interference signal information from the peak; the interference signal replica generator 21 generates the interference signal replica based on the interference signal information; and the interference signal removal unit 23 removes the interference signal replica from the signal received by the main antenna 11. Even when the signal other than the cancel target signal is inputted, the deterioration in the communication quality of the desired signal can be prevented.

(Second Noise Canceler: FIG. 7)

Hereinafter, a second noise canceler (second noise canceler) according to an embodiment of the present invention will be described with reference to FIG. 7. FIG. 7 is a block diagram showing a configuration of the second noise canceler.

As shown in FIG. 7, the second noise canceler is basically the same as the first noise canceler shown in FIG. 1 except in that an interference signal is inputted from the main antenna 11, not from the sub-antennas 12.

In the block diagram, both of the synthesization determination unit 24 and the replica generation determination unit 25 are illustrated. However, only one of them may be provided as in the first noise canceler or both of them may be provided. The signal inputted into the interference signal synthesizer 16 is not limited to that in the present embodiment and one or more signals may be inputted thereinto depending on a configuration of an antenna to be connected or the like. For example, when a single signal is inputted into the interference signal synthesizer 16, the synthesization determination unit 24 may output to the interference signal synthesizer 16 an instruction not to apply the signal determined not to be synthesized by the interference signal replica generator 21 to the output signal as in the case of determining whether to synthesize the interference signals.

Therefore, in the second noise canceler, the signal received by the main antenna 11 is inputted into the first delay unit 17 and also inputted into the first correlation value calculation unit 13 and the interference signal synthesizer 16.

The first correlation value calculation unit 13 correlates the signals received by the sub-antennas 12 and the main antenna 11 and calculates a correlation value.

The interference signal synthesizer 16 synthesizes the interference signals with the signals received by the sub-antennas 12 and the main antenna 11 based on the interference signal information from the first interference signal information acquisition unit 15.

(Effect of Second Noise Canceler)

In accordance with the second noise canceler, the interference signals are synthesized by using the interference signals received by the main antenna 11 as well as those received by the sub-antennas 12, and the interference signals are removed from the signals received by the main antenna 11 by generating replicas of the interference signals. Therefore, the second noise canceler can remove the interference signals with high accuracy compared to the first noise canceler. Even when the signal other than the signal to be canceled is inputted, the deterioration in the communication quality of the desired signal can be prevented.

The second noise canceler is effective when the number of the sub-antennas 12 is small. The second noise canceler may have the configuration shown in FIG. 7 in which a single main antenna 11 and a single sub-antenna 12 are provided.

Figure 8:
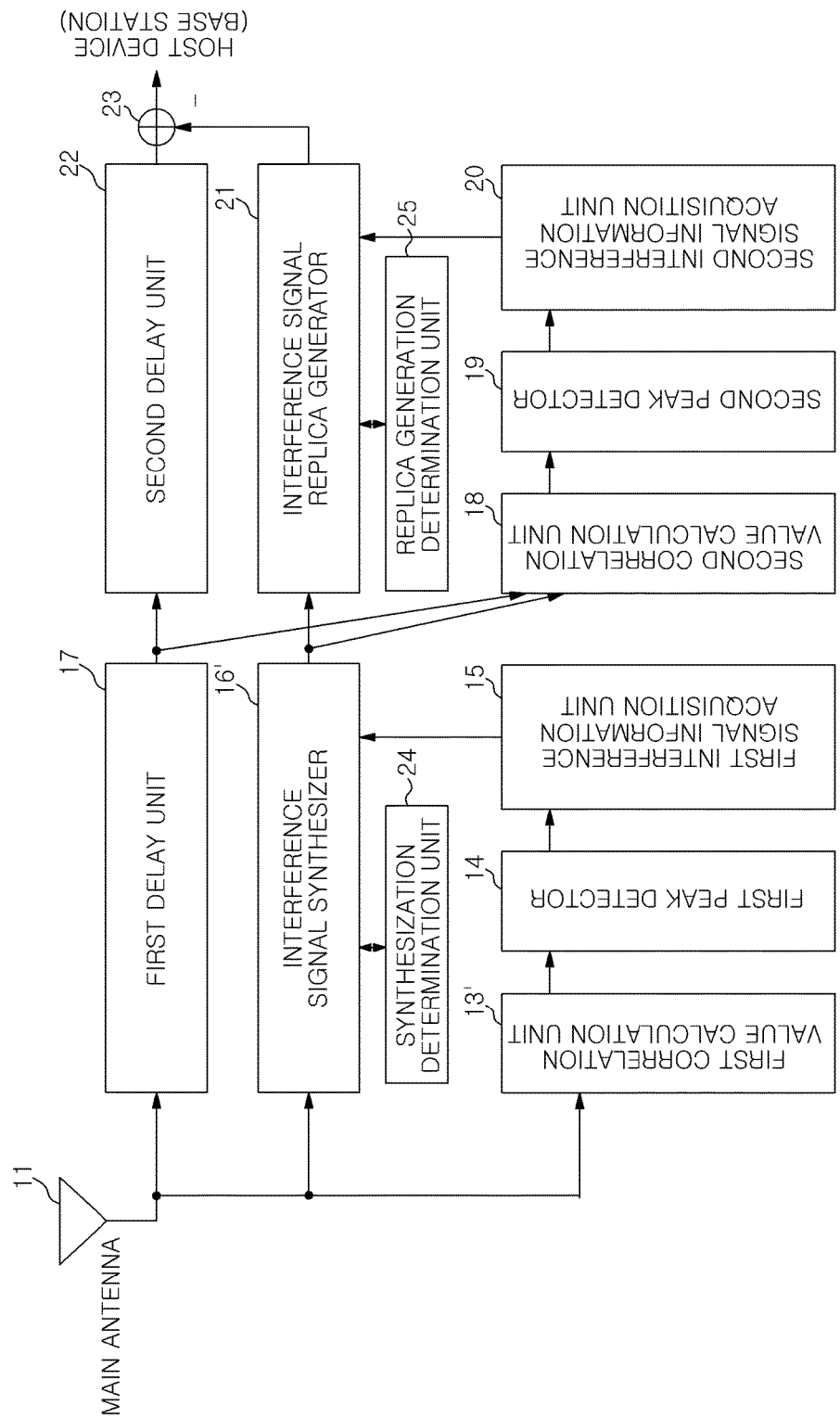
FIG. 8 is a block diagram showing a configuration of a third noise canceler.

(Third Noise Canceler: FIG. 8)

Next, a third noise canceler in accordance with an embodiment of the present invention will be described with reference to FIG. 8. FIG. 8 is a block diagram showing a configuration of the third noise canceler.

As shown in FIG. 8, the third noise canceler is difference from the first noise canceler shown in FIG. 1 in that the sub-antennas 12 are not provided.

The processing operations of a first correlation value calculation unit 13' and an interference signal synthesizer 16' are different from those in the first noise canceler. The other configurations of the third noise canceler are the same as those of the first noise canceler.

In the block diagram, both of the synthesization determination unit 24 and the replica generation determination unit 25 are illustrated. However, only one of them may be provided as in the first noise canceler or both of them may be provided. The signal inputted into the interference signal synthesizer 16 is not limited to that in the present embodiment and one or more signals may be inputted thereinto depending on a configuration of an antenna to be connected or the like. For example, when a single signal is inputted into the interference signal synthesizer 16, the synthesization determination unit 24 may output to the interference signal synthesizer 16 an instruction not to apply the signal determined not to be synthesized by the interference signal replica generator 21 to the output signal, as in the case of determining whether to synthesize the interference signals.

The third noise canceler does not include the sub-antenna 12 and, thus, the signal received by the main antenna 11 is inputted into the first delay unit 17, the interference signal synthesizer 16' and the first correlation value calculation unit 13'.

The first correlation value calculation unit 13' calculates a correlation value by performing correlation processing on the signals received by the main antenna 11 while shifting the timing and the phases thereof. The correlation processing in the first correlation value calculation unit 13' is self correlation processing.

The processing in the first peak detector 14 and that in the first interference signal information acquisition unit 15 are the same as those in the first noise canceler.

The interference signal synthesizer 16' synthesizes the interference signals while controlling the timing and the phase of the signal received by the main antenna 11 based on the interference signal information from the first interference signal information acquisition unit 15.

The other components of the third noise canceler perform the same processes as those of the first noise canceler.

(Effect of the Third Noise Canceler)

In accordance with the third noise canceler, the self correlation processing is performed on the signal received by a single main antenna 11; the interference signals are synthesized by detecting the peak; the interference signal replica is generated; and the interference signals are removed from the signal received by the main antenna 11. Therefore, the interference signals can be removed only by using a single main antenna 11. Even when the signal other than the cancel target signal is inputted, the deterioration in the communication quality of the desired signal can be prevented.

The third noise canceler does not include the sub-antenna and thus has a simpler configuration. However, the noise removal accuracy of the first and the second noise canceler is higher than that of the third noise canceler.

Figure 9:
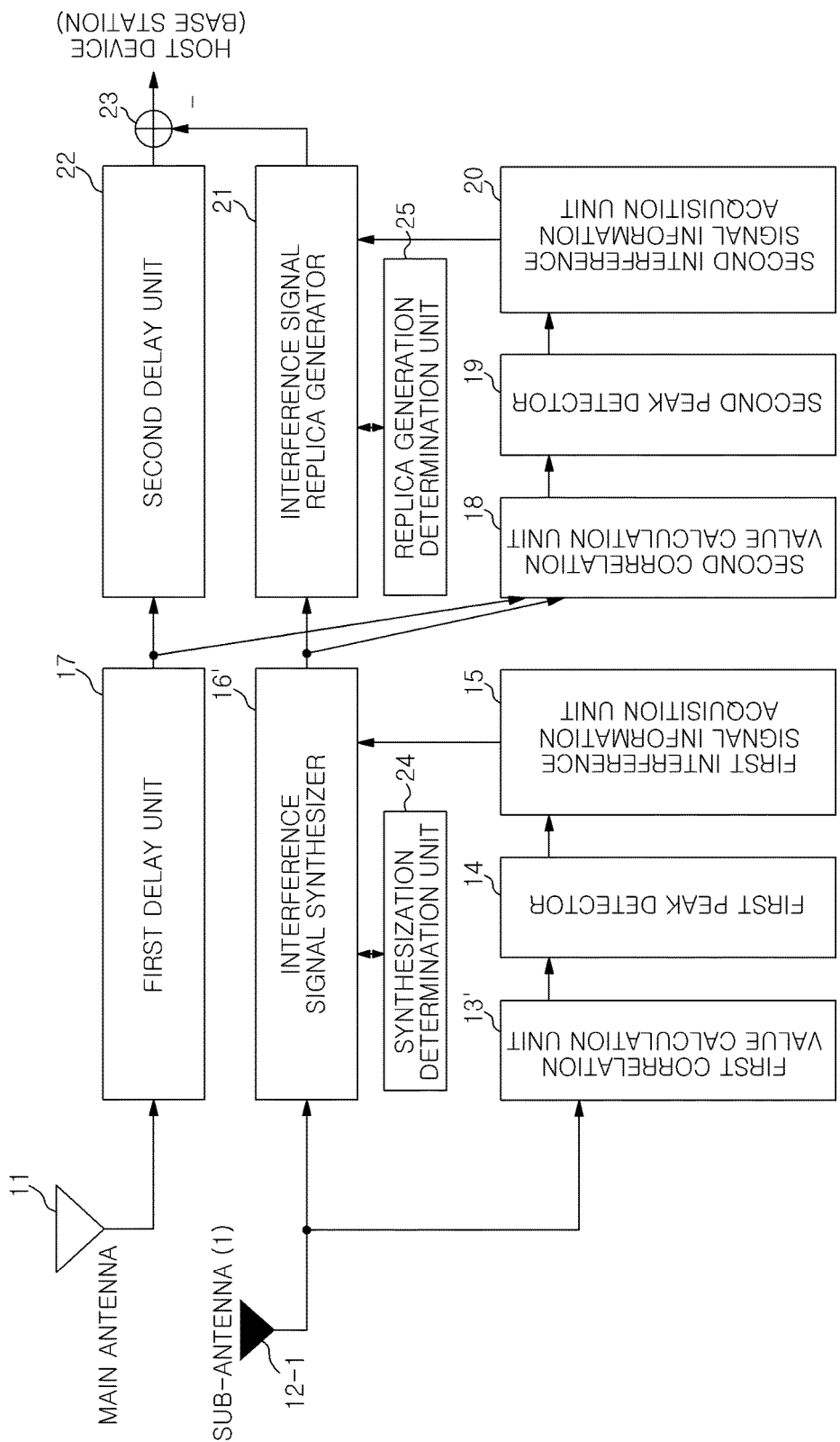
FIG. 9 is a block diagram showing a configuration of a fourth noise canceler.

(Fourth Noise Canceler: FIG. 9)

Next, a fourth noise canceler in accordance with an embodiment of the present invention will be described with reference to FIG. 9. FIG. 9 is a block diagram showing a configuration of the fourth noise canceler.

As shown in FIG. 9, the fourth noise canceler includes a main antenna 11 and a single sub-antenna 1 (12-1). A signal received by the main antenna 11 is inputted into the first delay unit 17 and a signal received by the sub-antenna 1 (12-1) is inputted into the first correlation value calculation unit 13' and the interference signal synthesizer 16'.

In the block diagram, both of the synthesization determination unit 24 and the replica generation determination unit 25 are illustrated. However, only one of them may be provided as in the first noise canceler or both of them may be provided. The signal inputted into the interference signal synthesizer 16 is not limited to that in the present embodiment and one or more signals may be inputted thereinto depending on a configuration of an antenna to be connected or the like. For example, when a single signal is inputted into the interference signal synthesizer 16, the synthesization determination unit 24 may output to the interference signal synthesizer 16 an instruction of preventing the signal determined not to be synthesized by the interference signal replica generator 21 from being applied to the output signal, as in the case of determining whether to synthesize the interference signals.

The first correlation value calculation unit 13' performs self correlation processing on the signal received by the sub-antenna 1 (12-1). The processing operation of the first correlation value calculation unit 13' in the fourth noise canceler is the same as that in the third noise canceler.

The interference signal synthesizer 16' synthesizes the interference signals based on the plurality of interference signal information included in the signal received by the sub-antenna 1 (12-1) which is obtained from the first interference signal information acquisition unit 15. The processing operation of the interference signal synthesizer 16' in the fourth noise canceler is the same as that in the third noise canceler.

The other configurations of the fourth noise canceler are the same as those of the first noise canceler.

(Effect of the Fourth Noise Canceler)

The fourth noise canceler performs self correlation processing on the signal received by a single sub-antenna 1 (12-1), synthesizes the interference signals by detecting the peak, generates the interference signal replica and removes the interference signal from the signal received by the main antenna 11. Therefore, the interference signal can be removed only by a single sub-antenna 1 (12-1). Even when the signal other than the cancel target signal is inputted, the deterioration in the communication quality of the desired signal can be prevented.

The fourth noise canceler has one sub-antenna 1 (12-1) in addition to the main antenna 11. Thus, the configuration can be simplified. However, the noise removal accuracy is higher than that in the third noise canceler.

(Fifth Noise Canceler: FIGS. 10 and 11)

Next, a fifth noise canceler in accordance with an embodiment of the present invention will be described with reference to FIGS. 10 and 11. FIG. 10 is a block diagram showing a configuration of the fifth noise canceler (for band A). FIG. 11 is a block diagram showing a configuration of the fifth noise canceler (for band B).

The fifth noise canceler has a configuration obtained by combining the configuration shown in FIG. 10 and the configuration shown in FIG. 11. The first interference signal information acquisition unit 15a shown in FIG. 10 and the first interference signal information acquisition unit 15b shown in FIG. 11 cooperate together.

"A" portion in FIG. 10 and "A" portion in FIG. 11 are connected.

In the block diagram, both of the synthesization determination unit 24 and the replica generation determination unit 25 are illustrated. However, only one of them may be provided as in the first noise canceler or both of them may be provided. The signal inputted into the interference signal synthesizer 16 is not limited to that in the present embodiment and one or more signals may be inputted thereinto depending on a configuration of an antenna to be connected or the like. For example, when the number of signal inputted into the interference signal synthesizer 16 is one, the synthesization determination unit 24 may output an instruction of preventing the signal determined not to be synthesized by the interference signal replica generator 21 from being applied to the output signal to the interference signal synthesizer 16, as in the case of determining whether to synthesize the interference signals will be synthesized.

Specifically, the noise canceler shown in FIG. 10 is used for a band A (specific frequency band A: e.g., 1.5 GHz band) and the noise canceler shown in FIG. 11 is used for a band B (specific frequency band B: e.g., 2.0 GHz band).

The basic configurations and operations of the noise cancelers shown in FIGS. 10 and 11 are the same as those of the first noise canceler shown in FIG. 1.

However, the processing operations in the first interference signal information acquisition unit 15a and in the first interference signal information acquisition unit 15b are different from those in the first noise canceler.

The first interference signal information acquisition unit 15a outputs interference signal information (a) to the first interference signal information acquisition unit 15b.

The first interference signal information acquisition unit 15a receives information signal information (b) from the first interference signal information acquisition unit 15b.

The first interference signal information acquisition unit 15a refers to the interference signal information (a) obtained based on the peak detected by the first peak detector 14 and the interference signal information (b) inputted from first interference signal information acquisition unit 15b. When the timing thereof and the like are the same, the information determined to have higher accuracy is outputted to the interference signal synthesizer 16a.

The interference signal synthesizer 16a synthesizes the interference signals based on the above information.

Similarly, the first interference signal information acquisition unit 15b outputs the interference signal information (b) to the first interference signal information acquisition unit 15a and receives the interference signal information (b) from the first interference signal information acquisition unit 15a.

The first interference signal information acquisition unit 15b calculates an average of the interference signal information (a) obtained based on the peak detected by the first peak detector 14b and the interference signal information (b) inputted from first interference signal information acquisition unit 15a and outputs the information of the average value to the interference signal synthesizer 16b.

The interference signal synthesizer 16b synthesizes the interference signals based on the information of the average value.

In the first interference signal information acquisition units 15a and 15b of the fifth noise canceler, the interference signal information (a) and (b) are compared. When the reception level of the interference signal is greater than or equal to a specific threshold value, the information having a higher reception level is selected and the selected interference signal information may be outputted to the interference signal synthesizers 16a and 16b.

The first interference signal information acquisition units 15a and 15b of the fifth noise canceler determines whether or not the reception level of the interference signal information is greater than or equal to the specific threshold value. When it is greater than or equal to the threshold value, the interference signal information having a higher reception level is selected. When it is smaller than the threshold value on the assumption that the interference signals have the same timing or the like, the information determined to have higher accuracy may be outputted to the interference signal synthesizers 16a and 16b.

(Effect of Fifth Noise Canceler)

In accordance with the fifth noise canceler, when a plurality of channels of the interference signal is expanded to a broadband as in the case of a BS signal, sub-antennas 12a and 12b for different band (bands A and B) are installed and the interference signal information is acquired by the first interference signal information acquisition units 15a and 15b and provided to the first interference signal information acquisition units 15b and 15a in another band. When they have the same timing, the interference signal information determined to have higher accuracy or the information signal information having a higher reception level is used for synthesizing the interference signals in the interference signal synthesizers 16a and 16b. Therefore, the interference signal can be removed with high accuracy from the signals received by the main antennas 11a and 11b by using the interference signal information in different bands. Even when the signal other than the cancel target signal is inputted, the deterioration in the communication quality of the desired signal can be prevented.

In other word, in the fifth noise canceler, the interference signal information in different bands are shared and used for synthesizing the interference signals.

The fifth noise canceler is formed by combining the first noise cancelers. However, the fifth noise canceler may be configured by any type of combination of the first to the fourth noise cancelers.

In other words, the fifth noise canceler may be formed by combining the first noise canceler and the first noise canceler, the first noise canceler and the second noise canceler, the first noise canceler and the third noise canceler, the first noise canceler and the fourth noise canceler, the second noise canceler and the second noise canceler, the second noise canceler and the third noise canceler, the second noise canceler and the fourth noise canceler, the third noise canceler and the third noise canceler, the third noise canceler and the fourth noise canceler, the third noise canceler and the fourth noise canceler, and the fourth noise canceler and the fourth noise canceler.

(Application Example: Directivity of Sub-Antenna)

Hereinafter, an application example of the present embodiment will be described.

The noise cancelers except the third noise canceler have sub-antennas. If the sub-antennas have directivity toward a specific interference source, the interference signal can be received with high accuracy. Accordingly, the cancel effect can be improved.

(Effects of Embodiments)

In accordance with the embodiments of the present invention, the information on the interference signal is acquired by performing cross-correlation processing on a plurality of received interference signals; the plurality of received interference signals is synthesized based on the information and outputted; the information on the interference signal included in the received signals is acquired by performing correlation processing on the received signals and the synthesized interference signal; the interference signal replica is generated based on the information; and the interference signal is removed by subtracting the interference signal replica from the received signals. Therefore, the communication quality of the desired signal is improved by removing the interference signal from another system. Even when the signal other than the cancel target signal is inputted, the deterioration in the communication quality of the desired signal can be prevented.

In accordance with the embodiments of the present invention, the information on a plurality of interference signals included in the received signals is acquired by performing the self correlation processing on the received signals; the interference signals included in the received signals are synthesized based on the information and outputted; the information on the interference signals included in the received signals is acquired by performing a correlation processing on the received signals and the synthesized interference signals; the interference signal replica is generated based on the information; and the interference signals are removed by subtracting the interference signal replica from the received signals. Therefore, the communication quality of the desired signal is improved by removing the interference signal from another system. Even when the signal other than the cancel target signal is inputted, the deterioration in the communication quality of the desired signal can be prevented.

In accordance with the present invention, a plurality of noise cancelers is combined for each band; the information on the interference signals which is used for synthesizing the interference signals is shared; and the information determined to have higher accuracy or the information having a high reception level among the acquired information on the interference signals is used. Therefore, the interference signals can be removed with high accuracy from the received signals by using the information on the interference signals in different bands. Even when the signal other than the cancel target signal is inputted, the deterioration in the communication quality of the desired signal can be prevented.

This application claims priority to Japanese Patent Application No. 2015-109997 filed on May 29, 2015, the entire contents of which is incorporated herein by reference.

INDUSTRIAL APPLICABILITY

The present invention is suitable for a noise canceler capable of improving a communication quality of a desired signal by removing an interference signal from another system.

DESCRIPTION OF REFERENCE NUMERALS 11, 11a, 11b: main antenna
12, 12a, 12b: sub-antenna
13, 13', 13a, 13b: first correlation value calculation unit
14, 14a, 14b: first peak detector
15, 15a, 16b: first interference signal information acquisition unit
16, 16', 16a, 16b: interference signal synthesizer
17, 17a, 17b: first delay unit
18, 18a, 18b: second correlation value calculation unit
19, 19a, 19b: second peak detector
20, 20a, 20b: second interference signal information acquisition unit
21, 21a, 21b: interference signal replica generator
22, 22a, 22b: second delay unit
23, 23a, 23b: interference signal removal unit
24: synthesization determination unit
25: replica generation determination unit

What is claimed is:

1. A noise canceler comprising:
   an interference signal synthesizer configured to acquire information on a plurality of received interference signals by performing cross-correlation processing on the plurality of received interference signals, synthesize the plurality of received interference signals based on the information and output the synthesized interference signal;
   a replica generator configured to acquire information on an interference signal included in a received signal by correlating the received signal and the synthesized interference signal and generate an interference signal replica based on the information;
   an interference signal removal unit configured to remove the interference signal by subtracting the interference signal replica from the received signal; and
   a synthesization determination unit configured to monitor characteristics of signals inputted into the interference signal synthesizer and controls the interference signal synthesizer not to synthesize a signal having predetermined characteristics among the monitored signals.

2. The noise canceler of claim 1, wherein the synthesization determination unit monitors a signal level as characteristics of signals inputted into the interference signal synthesizer at a long period average and a short period average and controls the interference signal synthesizer not to perform the synthesization when the short period average is greater than the long period average by a predetermined threshold value or more.

3. The noise canceler of claim 1, wherein the synthesization determination unit monitors frequency characteristics as characteristics of signals inputted into the interference signal synthesizer and controls the interference signal synthesizer not to perform the synthesization when the frequency characteristics are greater than a predetermined signal level of a signal in a narrow band other than a predetermined cancel target signal.

4. A noise canceler comprising:
   an interference signal synthesizer configured to acquire information on a plurality of received interference signals by performing cross-correlation processing on the plurality of received interference signals, synthesize the plurality of received interference signals based on the information and output the synthesized interference signal;

a replica signal generator configured to acquire information on an interference signal included in a received signal by correlating the received signal and the synthesized interference signal and generate an interference signal replica based on the information;

an interference signal removal unit configured to remove the interference signal by subtracting the interference signal replica from the received signal; and a replica generation determination unit configured to monitor characteristics of the interference signal replica generated by the interference signal replica generator and control the interference signal replica generator not to output the interference signal replica to the interference signal removal unit when the monitored signal is a signal having predetermined characteristics.

5. The noise canceler of claim 4, wherein the replica generation determination unit monitors a signal level as characteristics of the interference signal replica generated by the interference signal replica generator at a long period average and a short period average and controls the interference signal replica generator not to performed the output when the short period average is greater than the long period average by a predetermined threshold value or more.

6. The noise canceler of claim 4, wherein the replica generation determination unit monitors frequency characteristics and a signal level as characteristics of the interference signal replica generated by the interference signal replica generator and controls the interference signal replica generator not to perform the output when the frequency characteristics are greater than a predetermined signal level of a signal in a narrow band other than a predetermined cancel target signal.

7. A noise canceler comprising:

an interference signal synthesizer configured to acquire information on a plurality of interference signals included in a received signal by performing self correlation processing on the plurality of interference signals, synthesize the plurality of interference signals based on the information and output the synthesized interference signal;

an interference signal replica generator configured to acquire information on an interference signal included in the received signal by correlating the received signal and the synthesized interference signal and generate an interference signal replica based on the information;

an interference signal removal unit configured to remove the interference signal by subtracting the interference signal replica from the received signal; and a synthesization determination unit configured to monitor characteristics of signals inputted into the interference signal synthesizer and prevent a signal having predetermined characteristics among the monitored signals from being synthesized.

8. The noise canceler of claim 7, wherein the synthesizing determination unit monitors a signal level as characteristics of signals inputted into the interference signal synthesizer at a long period average and a short period average and controls the interference signal synthesizer not to perform the sythesization when the short period average is greater than the long period average by a predetermined threshold value or more.

9. The noise canceler of claim 7, wherein the synthesizing determination unit monitors frequency characteristics and a signal level as characteristics of signals inputted into the interference signal synthesizer and controls the interference signal synthesizer not to perform the sythesization when the frequency characteristics are greater than a predetermined signal level of a signal in a narrow band other than a predetermined cancel target signal.

10. A noise canceler comprising:

an interference signal synthesizer configured to acquire information on a plurality of interference signals included in a received signal by performing self correlation processing on the plurality of interference signals, synthesize the plurality of interference signals included in the received signal based on the information, and output the synthesized interference signal;

an interference signal replica generator configured to acquire information on an interference signal included in the received signal by correlating the received signal and the synthesized interference signal and generate an interference signal replica based on the information;

an interference signal removal unit configured to remove the interference signal by subtracting the interference signal replica from the received signal; and a replica generation determination unit configured to monitor characteristics of the interference signal replica generated by the interference signal replica generator and prevent the interference signal replica from being outputted to the interference signal removal unit when the monitored signal is a signal having predetermined characteristics.

11. The noise canceler of claim 10, wherein the replica generation determination unit monitors a signal level as characteristics of the interference signal replica generated by the interference signal replica generator at a long period average and a short period average and controls the interference signal replica generator not to perform the output when the short period average is greater than the long period average by a predetermined threshold value or more.

12. The noise canceler of claim 10, wherein the replica generation determination unit monitors frequency characteristics and a signal level as characteristics of the interference signal replica generated in the interference signal replica generator and controls the interference signal replica generator not to perform the output when the frequency characteristics are greater than a predetermined signal level of a signal in a narrow band other than a predetermined cancel target signal.

* * * * *